United States Patent
Vaucher

(10) Patent No.: US 11,720,933 B2
(45) Date of Patent: *Aug. 8, 2023

(54) AUTOMATIC ADAPTIVE VIDEO EDITING

(71) Applicant: SoClip!, Bandol (FR)

(72) Inventor: Christophe Vaucher, Bandol (FR)

(73) Assignee: SOCLIP!, Bandol (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/005,188

(22) Filed: Aug. 27, 2020

(65) Prior Publication Data

US 2021/0065253 A1 Mar. 4, 2021

Related U.S. Application Data

(60) Provisional application No. 62/894,258, filed on Aug. 30, 2019.

(51) Int. Cl.
*G06Q 30/0241* (2023.01)
*G11B 27/036* (2006.01)

(52) U.S. Cl.
CPC ....... *G06Q 30/0277* (2013.01); *G11B 27/036* (2013.01)

(58) Field of Classification Search
CPC .. G06Q 30/0277; G11B 27/036; G11B 27/10; G11B 27/031
See application file for complete search history.

(56) References Cited

U.S. PATENT DOCUMENTS

| | | | | |
|---|---|---|---|---|
| 7,127,120 B2* | 10/2006 | Hua | ..... | G11B 27/034 382/254 |
| 7,421,391 B1* | 9/2008 | Merkel | ..... | G06Q 30/02 704/270 |
| 9,032,298 B2* | 5/2015 | Segal | ..... | G06Q 30/06 715/723 |
| 2004/0085341 A1* | 5/2004 | Hua | ..... | G11B 27/28 |
| 2008/0016114 A1* | 1/2008 | Beauregard | ..... | G11B 27/031 |
| 2008/0172274 A1* | 7/2008 | Hurowitz | ..... | H04L 67/61 455/433 |
| 2010/0183280 A1* | 7/2010 | Beauregard | ..... | G11B 27/34 386/285 |

(Continued)

OTHER PUBLICATIONS

Ahanger, Automatic Composition Techniques for Video Production, Nov. 1, 1998, IEEE vol. 10, Issue 6, pp. 967-987.*

*Primary Examiner* — Arthur Duran
(74) *Attorney, Agent, or Firm* — Polsinelli

(57) ABSTRACT

The disclosed technology provides solutions for automatically generating customizable advertisements based on user preferred musical selection. In some aspects, a process of the disclosed technology can include steps for receiving a first video segment and a second video segment, receiving an audio file wherein the audio file comprises a musical selection corresponding with preferences of at least one user, and automatically editing the first video segment, based on the musical selection to produce a first edited segment. In some aspects, the process further includes operations for automatically editing the second video segment to produce a second edited segment, and automatically combining the first edited segment with the second edited segment and the musical selection. Systems and machine-readable media are also provided.

20 Claims, 12 Drawing Sheets

(56) References Cited

U.S. PATENT DOCUMENTS

| | | | |
|---|---|---|---|
| 2010/0190555 A1* | 7/2010 | Dutilly | A63F 13/493 |
| | | | 463/43 |
| 2010/0211200 A1* | 8/2010 | Kobayashi | G06F 3/165 |
| | | | 700/94 |
| 2011/0150428 A1* | 6/2011 | Eggink | G11B 27/034 |
| | | | 386/285 |
| 2012/0190386 A1* | 7/2012 | Anderson | G01S 19/14 |
| | | | 455/456.3 |
| 2014/0096002 A1* | 4/2014 | Dey | G06F 3/04817 |
| | | | 715/723 |
| 2015/0071619 A1* | 3/2015 | Brough | G11B 27/10 |
| | | | 386/285 |
| 2015/0162997 A1* | 6/2015 | Francois | H04H 20/82 |
| | | | 381/61 |
| 2017/0092247 A1* | 3/2017 | Silverstein | G10H 1/0025 |
| 2018/0192108 A1* | 7/2018 | Lyons | H04N 21/2668 |
| 2019/0244639 A1* | 8/2019 | Benedetto | G11B 27/11 |
| 2020/0013379 A1* | 1/2020 | Vaucher | G11B 27/031 |

\* cited by examiner

AUTOMATIC ADAPTIVE VIDEO EDITING

CROSS-REFERENCE TO RELATED APPLICATIONS

This application claims the benefit of U.S. application Ser. No. 62/894,258, filed Aug. 30, 2019, entitled "AUTO ADAPTIVE VIDEO AD EDITING TECHNOLOGY", which is incorporated by reference in its entirety.

FIELD

The present invention generally relates to a platform for audio-video editing and in particular, to a method for auto adaptive video ad editing that personalizes advertising content based on user preference information.

BACKGROUND

Due to the difficulties in personalizing advertising content, producers of such content often aim for mass appeal by generating content that a wide receiving audience can consume. This generally results in the same ad being sent to everyone. For conventional video-based ads, which may typically include a particular audio (e.g., musical) selection, the advertisements are often targeted at a specific demographic, such as an age cohort that is likely to enjoy the audio selections. However, such broad demographic ad targeting campaigns cannot take into consideration individual user preferences which may therefore fail to effectively reach specific users within the intended demographic. Additionally, conventional ad compositions cannot be easily adapted to new or different audiences or individuals.

DESCRIPTION

Figure 1:
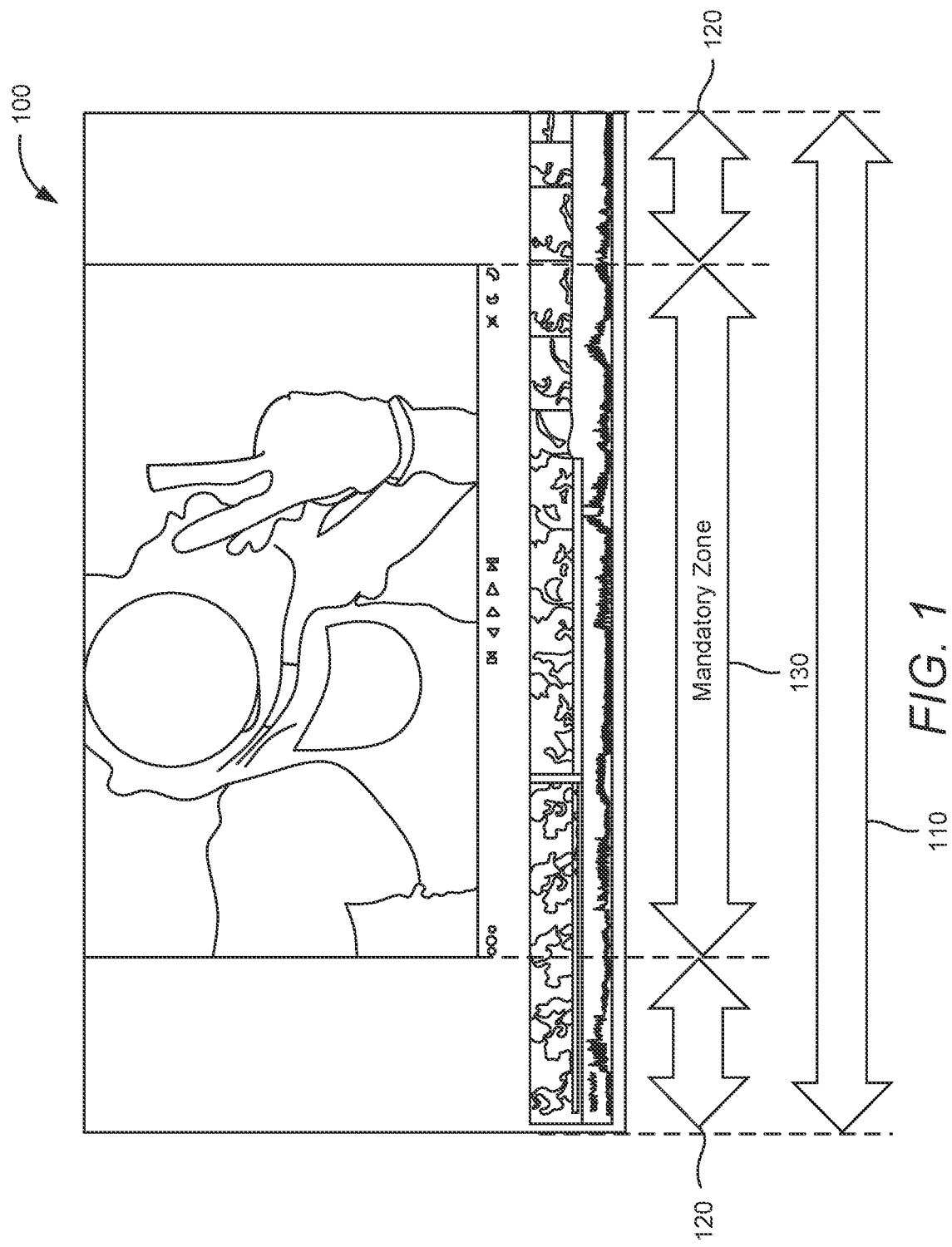
FIG. 1 conceptually illustrates an example of a raw video rush, indicating flexibility and mandatory zones, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Some conventional advertisement methodologies attempt to match advertisement subject matter with particular customer (user) demographics, such as by targeting advertisement (ad) delivery to users or customers on the basis of various factors such as location, age, purchase history and/or income, etc. However, such methodologies do not provide solutions for customizing advertising content (e.g., video and/or audio) to individual preferences.

The identification of musical artifacts is performed by first receiving a primary waveform representing a musical composition that has musical artifacts. The primary waveform is then filtered to generate alternative waveforms associated with the musical artifacts. The alternative waveforms are then analyzed to identify time points within the primary waveform that correspond to musical artifacts.

In some embodiments, the filtering of the primary waveform includes a first filtering that uses two or more interlaced band pass filters and outputs two or more secondary waveforms. The first filtering includes calculating samples' module for the secondary waveforms, identifying samples' modules that exceed a first predetermined frequency range threshold, identifying frequency ranges for each of the musical artifacts that have a most samples' module that exceeds the first predetermined frequency range threshold, and identifying a preliminary list of musical artifacts that are based on the most samples' module from the secondary waveforms that exceed the first predetermined frequency range.

In another embodiment, the filtering of the primary waveform includes a second filtering process of the primary waveform using either a low-pass filter or a resampling process that outputs a tertiary waveform. The second filter process includes calculating a tertiary waveform samples' so module moving average for each musical artifact frequency range and identifying for each of the musical artifacts at least one of samples' module moving average that exceeds a second predetermined frequency range threshold. The second filtering process then identifies a secondary list of musical artifacts that includes musical artifacts of the preliminary list, wherein the secondary list of musical artifacts includes the musical artifacts that have the samples' module moving average exceeding the second predetermined frequency range threshold at the time points within a range of with respect to the time points of the musical artifacts included on the preliminary list.

In a further embodiment, the filtering of the primary waveform also includes third filtering of the primary waveform using a high-pass filter that outputs a quaternary waveform. The third filtering process includes identifying samples' modules of the quaternary waveform that exceed a third predetermined second frequency range threshold identifying a tertiary list of musical artifacts that includes the musical artifacts of the secondary list. The tertiary list of musical artifacts includes the musical artifacts that have the samples' module of the quaternary waveform exceeding the third predetermined frequency range threshold within a range oft with respect to the time points of the musical artifacts included on the secondary list.

As described herein, musical artifacts are identifiable based on certain frequency and energy characteristics. Although this disclosure provides representative examples with respect to the identification of drum beats specifically (i.e., kick, snare and charlies), the identification of other types of musical artifacts is contemplated Based on the different musical artifacts detected, a next calculation can be performed that identifies musical artifact density for different portions of the musical composition. In particular, a musical artifact density corresponds to the number of different musical artifacts that are present within a pre-determined period of time. For example, an introductory period (e.g. 5 seconds) to the musical composition may have two different detected musical artifacts. However, during a later portion of the same musical composition, more musical artifacts (e.g. 15) may be detected within the same span of 5 seconds. The period of time used to evaluate musical artifact density can be customized by the user. For example, users may take into account characteristics of the musical composition when selecting how long the portions of the musical composition the density will be calculated.

In calculating the musical artifact density, characterizations and comparisons can be made identifying the number of musical artifacts that are detected from one portion of the musical composition to a different portion of the same musical composition. Comparisons can also be made based on portions of different musical compositions. Generally, the higher density that is detected within a portion of a musical composition, the more musical artifacts will be detected within the period of time.

A hit/no-hit output file can be generated based on the musical artifact density calculations performed. The hit/no-hit output file can be used to identify portions of the musical compositions where a minimum density (e.g. number of musical artifacts per period of time) threshold of musical artifacts is detected. The portions of the musical compositions that have a greater number of musical artifacts than the pre- determined minimum density are labeled as "hit" sections while the portions of the musical composition that do not have the requisite minimum density of musical artifacts are labeled as "no-hit" sections. It should be noted that users are able to customize the minimum number of artifacts during a period of time (e.g. threshold density) that would be used to characterize portions of the musical composition as "hit" or "no-hit" sections.".

Aspects of the disclosed technology address limitations of conventional digital (e.g. audio-video) advertisements by providing a platform that facilitates the generation of customized digital advertisements based on user preference information. Specifically, the disclosed technology provides methods in which digital advertisements can be generated using personalized musical selections that correspond with specific individual tastes and preferences. As discussed in further detail below, the customization of digital advertisements can help to encourage continued user ad engagement, thereby improving advertising campaign effectiveness.

As used herein, a digital advertisement or multimedia advertisement can refer to any audio-video content that has an associated audio portion (e.g. music) that is played concurrently with video-based media. Although some details regarding the editing of mixed audio/video compositions based on beat matching is described below, additional details regarding beat matching are provided by U.S. patent application Ser. No. 16/503,379, entitled "Beat Decomposition to Facilitate Automatic Video Editing" (hereinafter, the '379 application) which is incorporated herein by reference.

FIG. 1 illustrates an example video advertisement 100 that can be used in connection with customizing advertisements based on user preferences. In particular, FIG. 1 provides an example of how the flexibility zones 120 and mandatory zones 130 can be arranged with respect to a raw rush (video segment) 110. Any number of different arrangements can be provided based on the advertiser's preference. By using flexibility zones 120 and mandatory zones 130, advertisers are able to control what minimum portions of the raw rush 110 must be used and thus will be seen by the viewers as intended by the advertisers.

As illustrated, example video advertisement 100 can be any video content used to advertise any number of products or services. Video advertisement 100 can consist of one or more distinct raw rushes (e.g., video segments) 110. Raw rushes, as described herein, correspond to individual video segments or video clips that together compose a video advertisement, such as video advertisement 100. In an embodiment, the video advertisement 100 can be composed to promote a product or service. However, it is understood that the video mixing techniques described herein may be used for other purposes, without departing from the scope of the disclosed technology.

By way of example, a first segment or clip 110 may first show a product being used in one environment. A different segment or clip 110 may show the same product being used in a different environment or with a different group of users. When video advertisements include two or more distinct segments (or video clips), the segments (or clips) may be connected to one another and played sequentially as one continuous piece of video content, i.e., as a single advertisement.

With each raw rush 110, the corresponding segment or clip can be broken into two various zones, for example, that correspond with editing permissions. In some aspects, a first type of zone is known as a flexibility zone 120. Flexibility zone 120 corresponds to sections of the segment or clip 110 where an advertiser would allow the placement or shifting of a cut (or transition) between two rushes, e.g., between different video segments. As discussed in further detail below, cuts, effects, and/or other transitions implemented within the flexibility zone 120 can be based on accompanying audio media (e.g. music). The position of the cut within the flexibility zone 120 can be based on an automated beat matching process, as further described in the '379 application. As such, the segment or clip 110 containing flexibility zone 120 could be customized to have different types of transitions or effects based on characteristics of the accompanying audio (e.g. music). This allows the same segment or clip 110 to be customized, through matching with different musical selections, that are mixed into various flexibility zones 120.

The second type of zone is known as a mandatory zone 130. The mandatory zone 130 corresponds to sections of the segment or clip 110 where cuts are not permitted (e.g., where transitions in the video portion of the advertisement cannot be modified). In other words, different users would see the same content regardless of the accompanying audio (e.g. music). However, in some aspects, other types effects (e.g., music dependent FX) may be permitted in mandatory zone 130. Depending on the desired implementation, control over access rights, i.e., the ability to define mandatory zones and/or flexibility zones, may reside with the content owner or creator. By controlling the mandatory zones 130 and flexibility zones 120, content owners/creators can limit downstream editing by advertisement creators and/or providers, etc.

Figure 2:
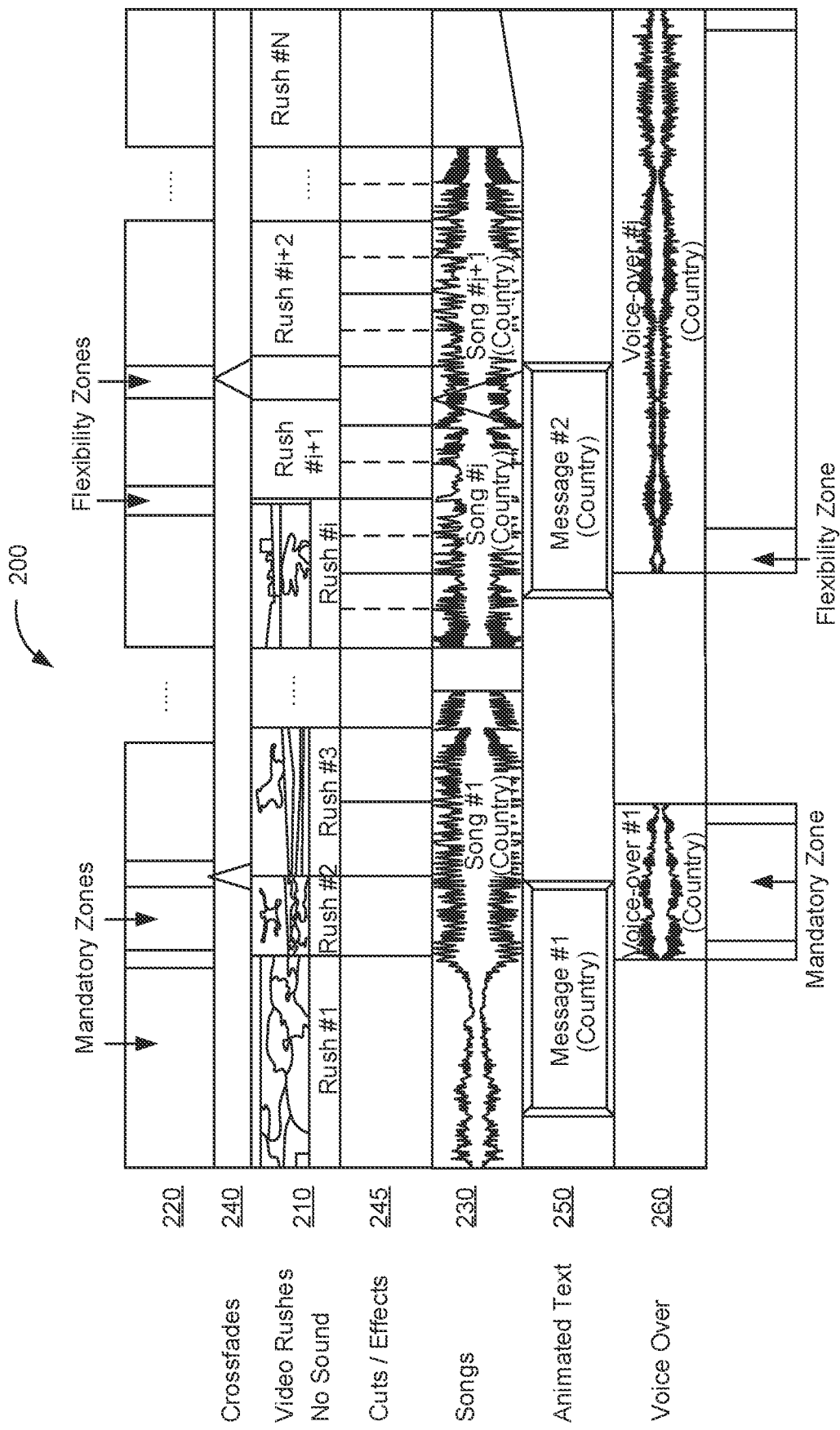
FIG. 2 conceptually illustrates an example of a master ad structure, according to some aspects of the disclosed technology.

FIG. 2 illustrates a more detailed example data structure 200 related to a customized digital advertisement. For example, data structure 200 can include one or more raw rushes 210 that correspond to video segments or clips without accompanying audio. Raw rushes 210 can include one or more different segments or clips that are played sequentially one after another for the duration of the digital advertisement (e.g. Rush #1, Rush #2, etc. . . . ).

As discussed with respect to FIG. 1, raw rushes 210 each contain defined mandatory zones and flexibility zones 220. As discussed above, mandatory zones are used to identify what portions of the raw rushes 210 must be featured in the final video advertisement, while the flexibility zones are used to identify where cuts (or transitions between the raw rushes 210) are permitted, for example, based on a selected accompany audio file (e.g. music/songs) 230. Since different songs 230 may be used in an advertisement, cut timing and effects ("FX") implemented within a flexibility zone may differ, thereby producing mixed-media digital advertisements that can incorporate musical selections specific to a user's preferences, or that may be selected based on user demographic information. Because ads need to spark emotion to be efficient (e.g. to have high ROI), musical customization provides a significant advantage for both original ad creators, and downstream ad editors.

In some implementations, systematic beat matching at the two ends (beginning and end) of a mandatory zone may be difficult. This is true especially when multiple rushes are used in a single final video clip, in part, because beat positions can be highly varying depending on songs. For example, they may occur every second for one audio segment, and every 1.5 s for another segment. If the mandatory zone duration is 1.8 s, it would have to be extended on each side to match the local beat of the running song. Accordingly, in some aspects, for a given song, time extensions are provided before and after the mandatory zone, for example, lasting 0.2 s, or 0.3 s before/after the mandatory zone. Time extensions may be defined on a zone by zone basis, and may be configurable, based on the video and/or audio content that is being mixed. As such, one purpose of the flexibility zone is to provide any necessary time extensions to the mandatory zones (on each side) so that the rush starts and ends on a beat, whatever the chosen song and corresponding beat.

As discussed above, the transitions between the raw rushes 210 can be implemented using the beat-matching technology in the '379 application. In addition, any number of different special effects can be implemented in connection with a raw rush 210 within the corresponding mandatory zones based on the accompany audio (e.g., song 230) in accordance with the teachings of the '379 application.

Described in further detail below, the songs 230 are combined with the raw rush 210 in order to generate the digital advertisement can be chosen in accordance to a viewer's preference. Instead of having a song that is chosen to best fit a wide variety of different users (which may or may not be preferred by a particular viewer), the present technology allows digital advertisements to be customized to implement features (specifically audio/music) that is preferred by target viewer.

By identifying who is currently viewing the advertisement and analyzing the preferences associated with that viewer, particular audio (e.g. music) can be chosen that can be incorporated into the video portion of the digital advertisement and used to customize the video portion as well.

Advertisers (or other third parties) may be able to generate profiles for each user based on information obtained (e.g. web-history, purchase history) or information provided by the viewer (e.g. surveys). For example, if a viewer prefers pop, a popular pop song can be chosen to accompany the digital advertisement. If another viewer prefers country music, a popular country song could be chosen. It may be possible that accompanying music can be chosen based on other parameters associated with viewer preference (e.g., artist). Because the accompanying song 230 can differ from viewer to viewer, the corresponding customizations 240 made to the raw rushes 210 may also differ.

The digital advertisement illustrated in the example data structure 200 can also incorporate animated text 250 and/or voice overs 260. Animated text 250 may correspond to text that appears while the digital advertisement is being shown. The substance and style of animated text 250 can be customized based on the accompanying song 230. The blocks associated with each animated text 250 indicate when the corresponding animated text 250 is incorporated into the digital advertisement.

Meanwhile, voice over 260 may correspond to an individual "speaking" to the viewer about the product or service being shown in the digital advertisement. Similar to animated text 250, voice over 260 may also be customized based on the accompanying song 230. Different speakers may be used to provide different types of voice overs 260. The different speakers may differ (e.g. age, gender, dialect) based on the type of song 230 being used.

In addition, voice over 260 may also include mandatory zones and flexibility zones. The voice over flexibility zones may be used to represent when the audio of the voice over 260 may begin within the raw rushes 210. The mandatory zones of the voice over 360 may indicate the portions of the voice over 260 that must be included within the final version of the advertisement.

Figure 3:
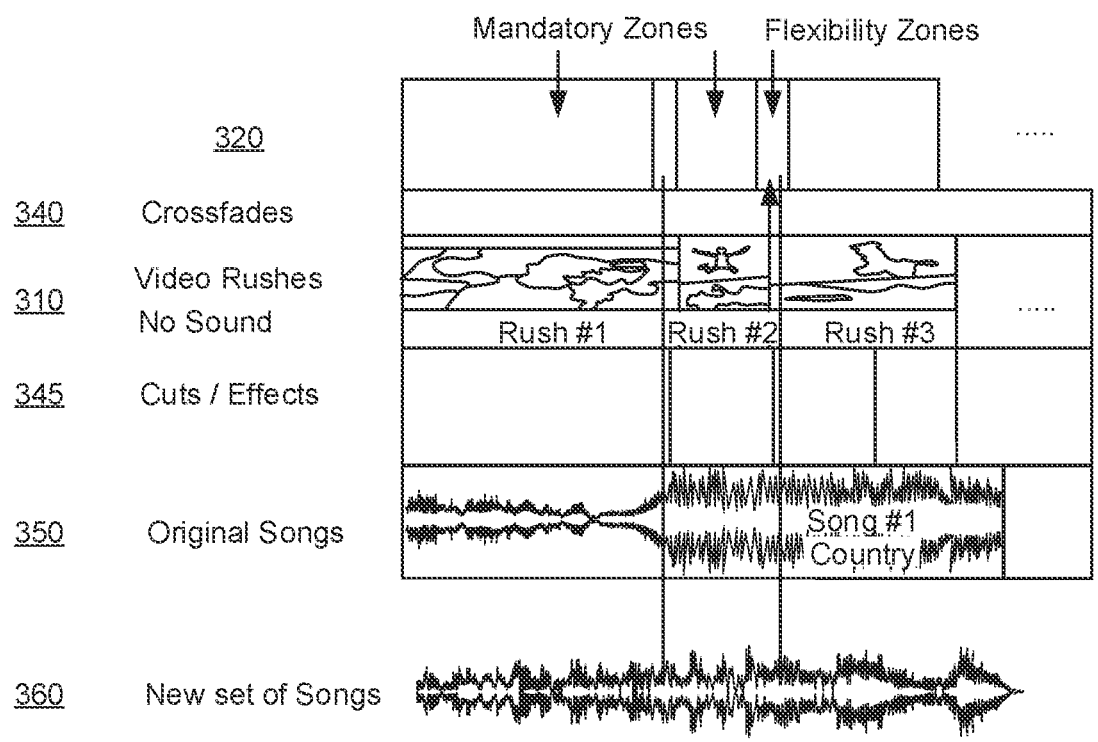
FIG. 3 conceptually illustrates an embodiment in which beat-matching can be performed to insert cuts into a selected flexibility zone, according to some aspects of the disclosed technology.

FIG. 3 illustrates an example beat matching scenario. As described above, the raw rushes will have any number of mandatory zones and/or flexibility zones (320). The combination of both the mandatory zones and flexibility zones identify when cuts or effects (345) can be implemented into a raw rush 310 based on the accompanying song whereby the cuts are used to transition between different raw rushes. Different cuts may be proposed based on the accompanying audio (e.g., song), for example, whenever a specific type of beat occurs. However, if the proposed cut occurs during one of the mandatory zones, the proposed cut will not be implemented. However, if a proposed cut occurs during one of the flexibility zones, the cut will be implemented. Furthermore, the timing of the cut will be based on the accompanying audio.

For example, a mandatory zone 320 of an advertisement associated with the first raw rush (e.g., Raw Rush #1) may end between two adjacent beats (e.g., beat A and beat B) of the accompanying song. The present technology will attempt to extend the advertisement being shown with the first raw rush using portions of the advertisement associated with the flexibility zone so that the subsequent beat (e.g., beat B) is reached. A transition can then occur at the subsequent beat (e.g., beat B) to the next raw rush (e.g., Raw Rush #2) such that the next advertisement can now be shown with the accompanying audio (e.g., song). Raw Rush #2 can then begin being shown using the same cut with respect to Raw Rush #1. The timing of what portion of the advertisement associated with Raw Rush #2 will then be shown. In some cases, Raw Rush #2 may begin at the start of its mandatory zone. In other embodiments, Raw Rush #2 may begin using portions within its flexibility zone—especially if more time is needed to reach a next cut to transition to a next raw rush (e.g., Raw Rush #3).

By using mandatory zones, different users (having potentially different preferences) still view the same portions of the raw rushes regardless of the accompanying audio (e.g., song). However, the flexibility zones introduce customization for each viewer by implementing cuts that correspond to the accompanying audio e.g., where some cuts may be earlier while other cuts may be later in the raw rush based on the accompany audio. In a further embodiment, the special effects associated with transition between raw rushes can also be based on the accompanying audio (e.g., type of drum beat).

The customization of the digital advertisement based on the associated song allows portions of the digital advertisements to be customized and edited based on the viewer's preferences. Therefore, one viewer who watches the advertisement with a preference for pop music would view a differently customized advertisement compared another viewer that prefers rock music.

Figure 4:
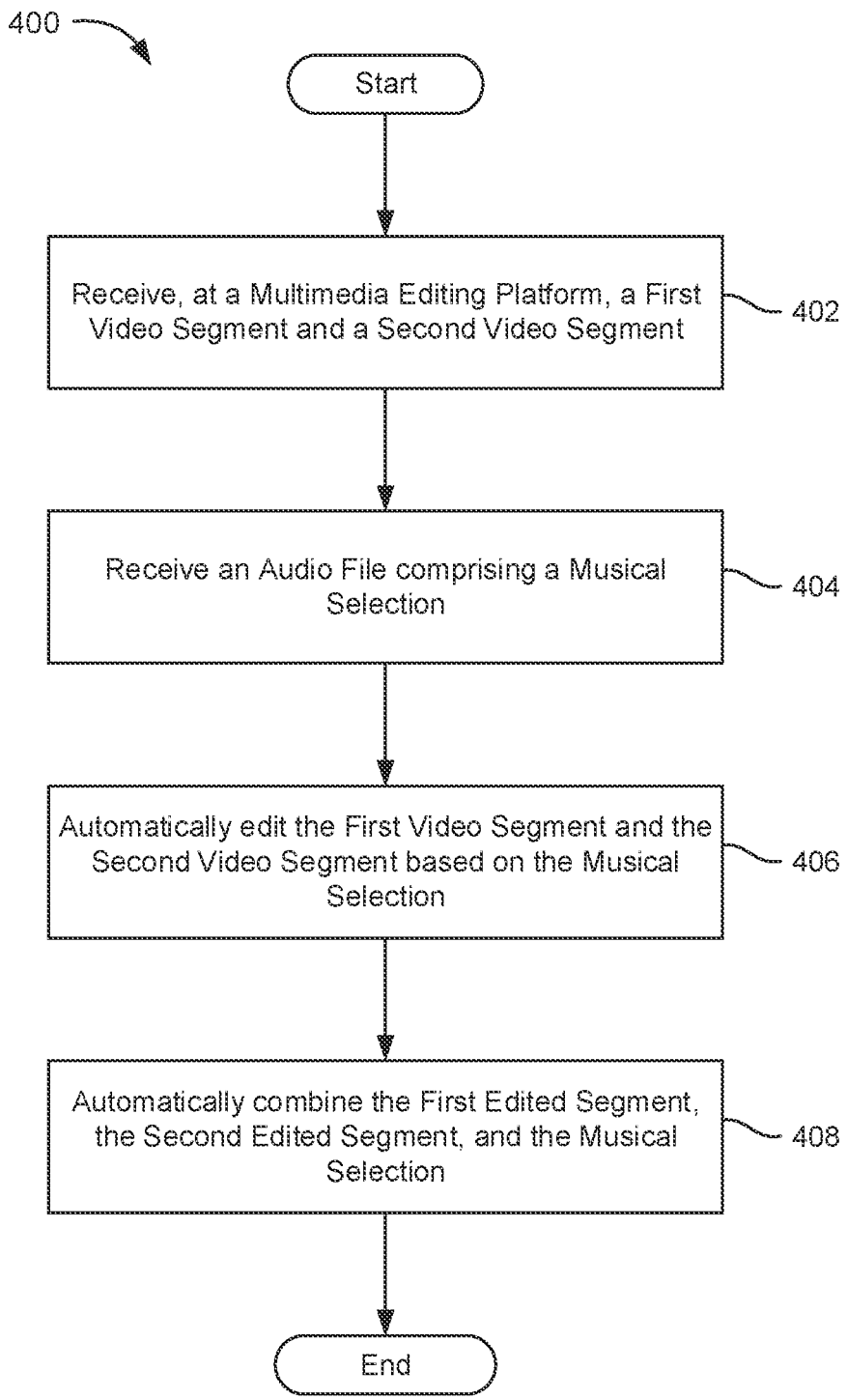
FIG. 4 illustrates steps of an example process for generating a personalized ad, according to some aspects of the disclosed technology.

FIG. 4 illustrates steps of an example process 400 for generating a personalized ad, according to some aspects of the disclosed technology. Process 400 begins with step 402, in which a first video segment, and a second video segment (e.g., raw rush) is received, for example, at a multimedia editing platform. In some implementations, the video segments may be video files that do not contain audio. However, in some instances, one or more still images (digital pictures) may be received by the video multimedia editing platform. Depending on the desired implementation the editing platform may be implemented as an application, for example, that is executed on a server, and/or executed using a number of distributed computing nodes, for example, in a cloud infrastructure. In some aspects, all (or portions) of the editing platform functionality may be hosted on a mobile processing device, such as a smart phone, notebook, or tablet computer, etc.

In step 404, an audio file comprising a musical selection is received at the editing platform. In some aspects, the audio file may contain one or more songs, for example, that represent musical selections congruent with the tastes or preferences of a target consumer (user), as discussed above with respect to FIGS. 2 and 3. As used herein, user preferences can include any information relating to preferences or inclinations of a given user. By way of example, user preferences may include musical taste preferences, for example, indicating a user's preferred musical genre/s, styles, and/or artists etc. In some aspects, user preferences may also encompass aesthetic preferences, such as preferences for video styles, effects ("FX"), and/or video skins, etc.

In step 406, the first video segment and the second video segment are automatically edited based on the musical selection. Editing of the video segments can be performed in flexibility zones of each of the video segments, e.g., whereby mandatory zones are left un-edited. Depending on the desired implementation, the flexibility zones may be defined by metadata that indicates time boundaries within each video segment corresponding with a given zone. As discussed above, cuts and/or effects can be inserted at different temporal locations in the flexibility zones based on beat matching performed on one or more musical selections in the audio file. The edited video segments (e.g., first edited segment, second edited segment) can then be used to prepare an advertisement that is targeted to the musical taste of a specific user, or group of users.

In step 408, the first edited segment and the second edited segment are automatically combined and mixed with the musical selection to generate a targeted ad output. The resulting ad output (i.e., mixed-media advertisement) can be of professional quality, e.g., similar to that which is produced by professional video editors given similar musical selection. It is understood that a greater (or fewer) number of video segments may be used without departing from the scope of the disclosed technology.

Figure 5A:
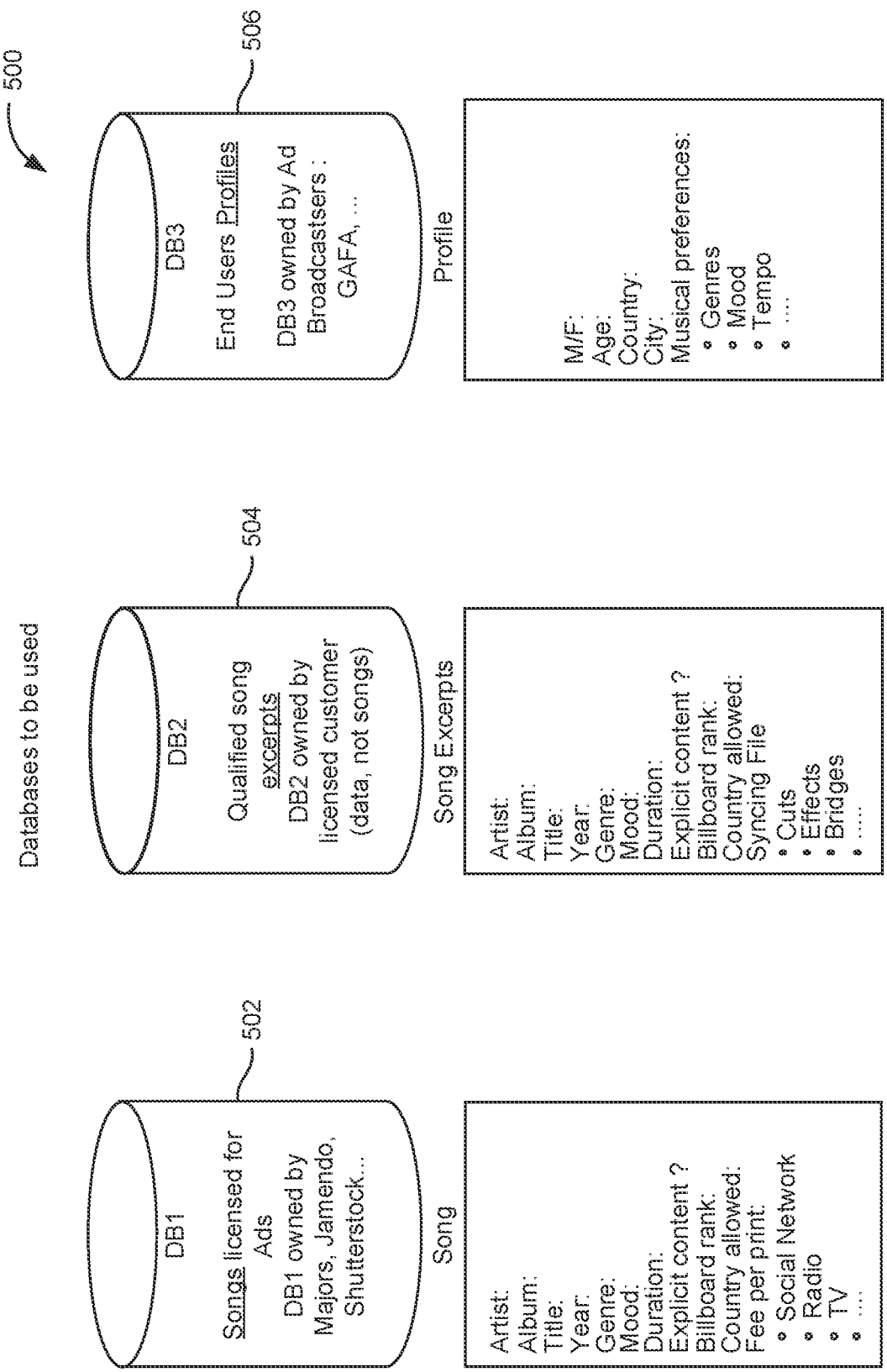
FIGS. 5A and 5B illustrate examples of various databases that can be configured to provide data for implementing various aspects of the disclosed technology.

FIG. 5A illustrates example databases 500 that are used in connection with the present technology. The databases 500 allow the present technology to customize the digital advertisements for each viewer based on preferences or characteristics of that viewer.

In the illustrated example, Database 1 (DB1) 502 covers the songs that can be used with the digital advertisement. These songs can correspond to a collection of mainstream songs which would need to be licensed in order to be incorporated into the digital advertisement. In other embodiments, it may be possible that database 1 can also include other types of songs (e.g. jingles) that advertisers themselves create for the purpose of customizing their digital advertisements. Advertisers could create a different jingle for different groups of viewers they are aiming to cover.

The songs (within DB1) 502 that could be incorporated into the digital advertisement could also have any number of different related information/characteristics also stored within the database. For example, information about each song such as the artist, album, title, year it was released, genre, the mood the song invokes, the duration of the song, whether the song has any explicit material, which countries the song could (or could not) be used, and fee per use (e.g. print) in connection with mediums such as social network, radio, television could be included. The information could be useful in identifying which song would best fit a particular user's preference. For example, information about explicit content and/or country could be used to filter and remove songs that are not appropriate for particular viewers (e.g. viewers that are minors).

Database 2 (DB2) 504 includes the information (e.g. characteristics) of each of the songs that can be used in connection with the digital advertisement. The information can include how the song may be used to customize the digital advertisement (e.g., what type of effects, cuts, transitions are introduced into the raw rushes) as well as any related information that may be useful in identifying that the song should be used in connection with a particular viewer. In addition, DB2 504 may also include the actual excerpts of the songs that have been authorized (e.g., licensed) for use with customizing the advertisements for different users.

While DB1 may include generic information for all possible songs that can be used, database 2 504 includes additional data needed to use this invention. With different advertisements, different sets of songs (from DB1) can be selected and stored into DB2 associated with a particular advertisement. For example, an advertiser could select 1 pop, rock, country, r&b song from DB1 502 and store that into DB2 504 for use with Advertisement A. Meanwhile, a different pop, rock, country, r&b song from DB1 502 can be selected and stored into DB2 for use with Advertisement B. The information for the songs in database 2 would then be matched with the viewer profile for each viewer who watches one of the advertisements. The corresponding pop, rock, country, or r&b song excerpt can then be selected that corresponds to the viewer preference.

As illustrated in the figure, example information stored within DB 2 504 may include similar information stored in DB 1 502 such as artist name, the album from which the song came from, the title of the song, the year the song was released, the genre in which the song is associated with, the mood that the song invokes, the duration of the song, the popularity of the song, whether the song has explicit content, and what countries the song would be allowed in.

Database 3 (DB3) 506 corresponds to information about different viewers (e.g. user profiles). The user profiles may be owned by the advertisers. In other embodiments, advertisers may have access to the DB 3 506 which is created and/or owned by a third party. In any case, the DB 3 506 includes information about each viewer that has been compiled through various means. For example, information about the viewer could be extracted from web activity (e.g. what sites the viewer visited, what music the viewer listens to on Spotify). Other information could be provided by the viewer (e.g. surveys).

In some aspects, DB3 506 could include information about the viewer such as their gender, their age, where the viewer is located, and any number of different preferences. Exemplary preferences could correspond to their musical preferences such as what genre of music they like to listen to, the mood they would like to be in when listening to music, or how fast/slow (e.g. tempo) the music is.

By using the information in DB 3 506, the present technology could identify one or more songs (the information of which is stored in database 2) that could be incorporated into a digital advertisement that the current viewer would prefer. The information in database 2 about the selected song could then be used to modify the digital advertisement so that a custom experience associated with that advertisement could be presented that would appeal to that viewer. The custom advertisement would not only have the song(s) that the user prefers but also customize/edit the corresponding digital advertisement would correspond with the selected song (via, the '379 application). For example, the location of the cuts within the flexibility zones as well as the different effects and transitions that can be applied to the advertisements can correspond to the accompanying song.

Figure 5B:
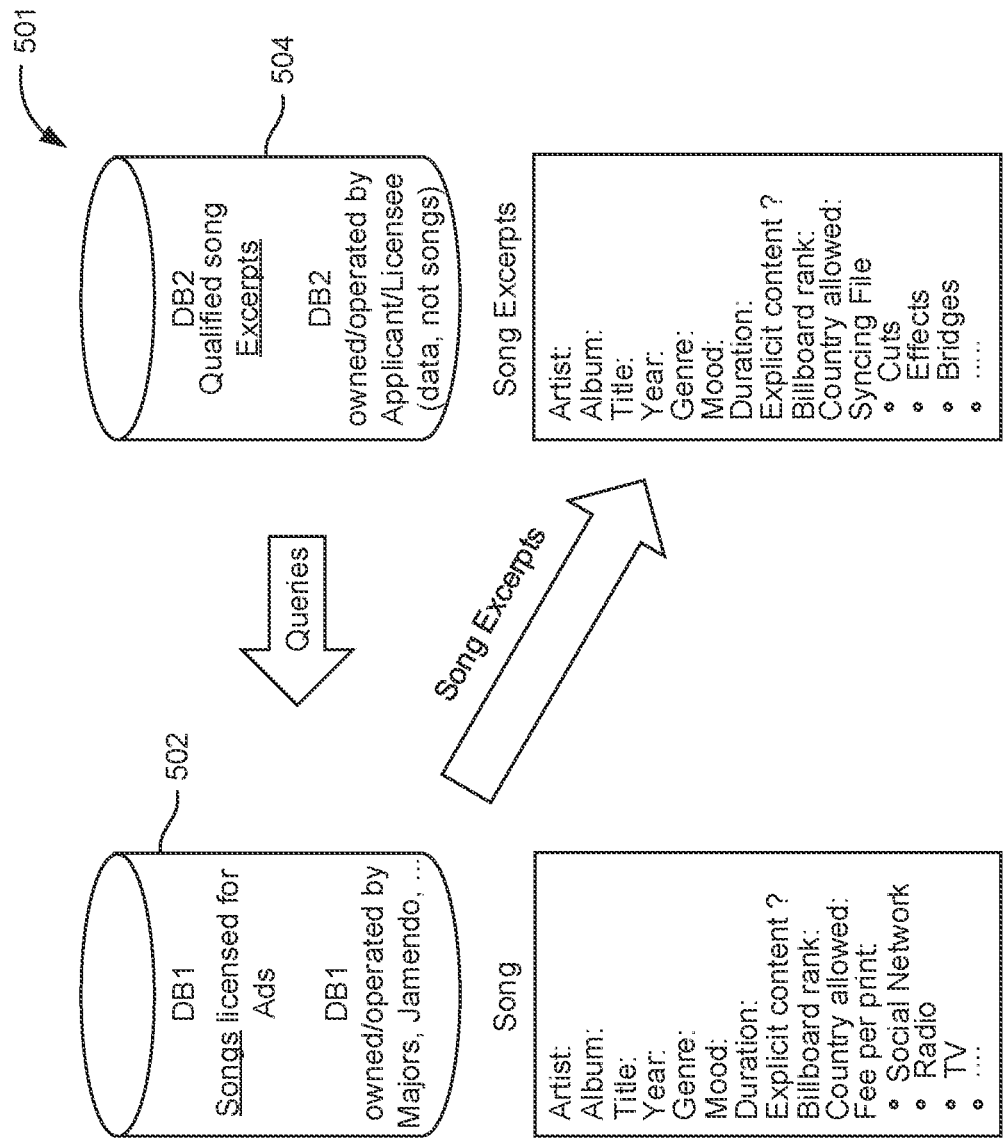

FIG. 5B illustrates an example of how DB 2 504 is built. An example DB2 504 includes the qualified song excerpts (e.g., not the entirety of the song) that would be incorporated into digital advertisements to match each viewer's musical preference. As such, DB2 504 can include the list of song excerpts that the advertiser (or third-party) would like to use with their advertisement based on the preferences of the viewer.

Once the advertiser has decided on what types of songs they would like to use in connection with their digital advertisement, the advertiser could perform a query on all available licensed songs that are stored in DB 1 502. The songs stored in DB 1 502 could be owned or licensed by the advertiser. The query may identify a specific sub-set of songs that the advertiser would like to use in connection with the digital advertisement, for example, based on artists, year, mood invoked, and fee/cost for using the song. Based on the query, the subset of songs could be identified and specific portions of those songs could be identified. Information about the identified subset of song portions can be extracted and stored within DB 2 504 where the information would identify how the digital advertisement would be modified if the song portion is used (e.g. cuts, effects, transitions). This information stored within DB 2 504 would be used by the present technology to automatically edit the digital advertisement to correspond to the selected song segment that could be chosen based on user preferences.

Figure 6A:
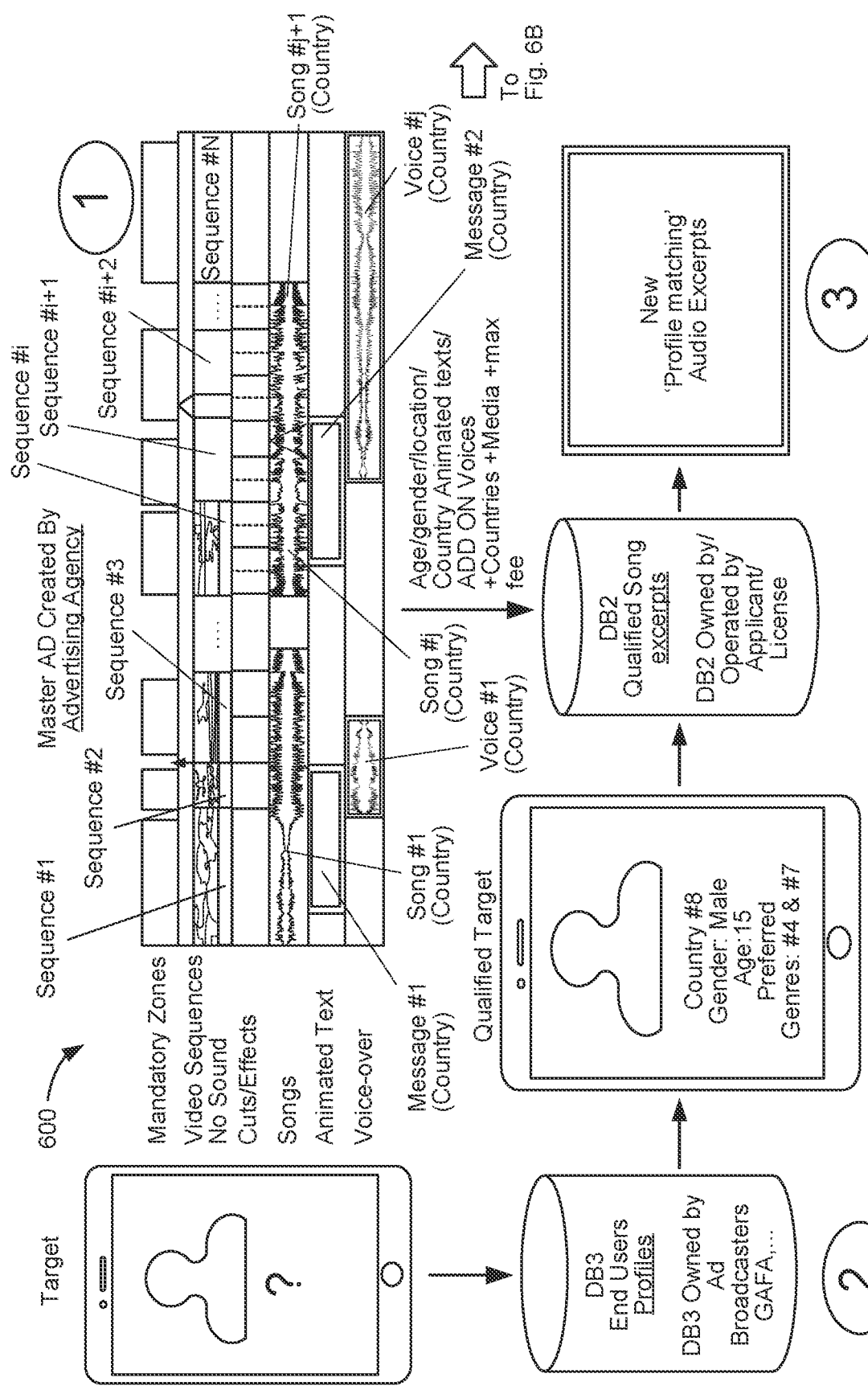
FIGS. 6A and 6B conceptually illustrate a customized ad generation process, according to some aspects of the disclosed technology.
Figure 6B:
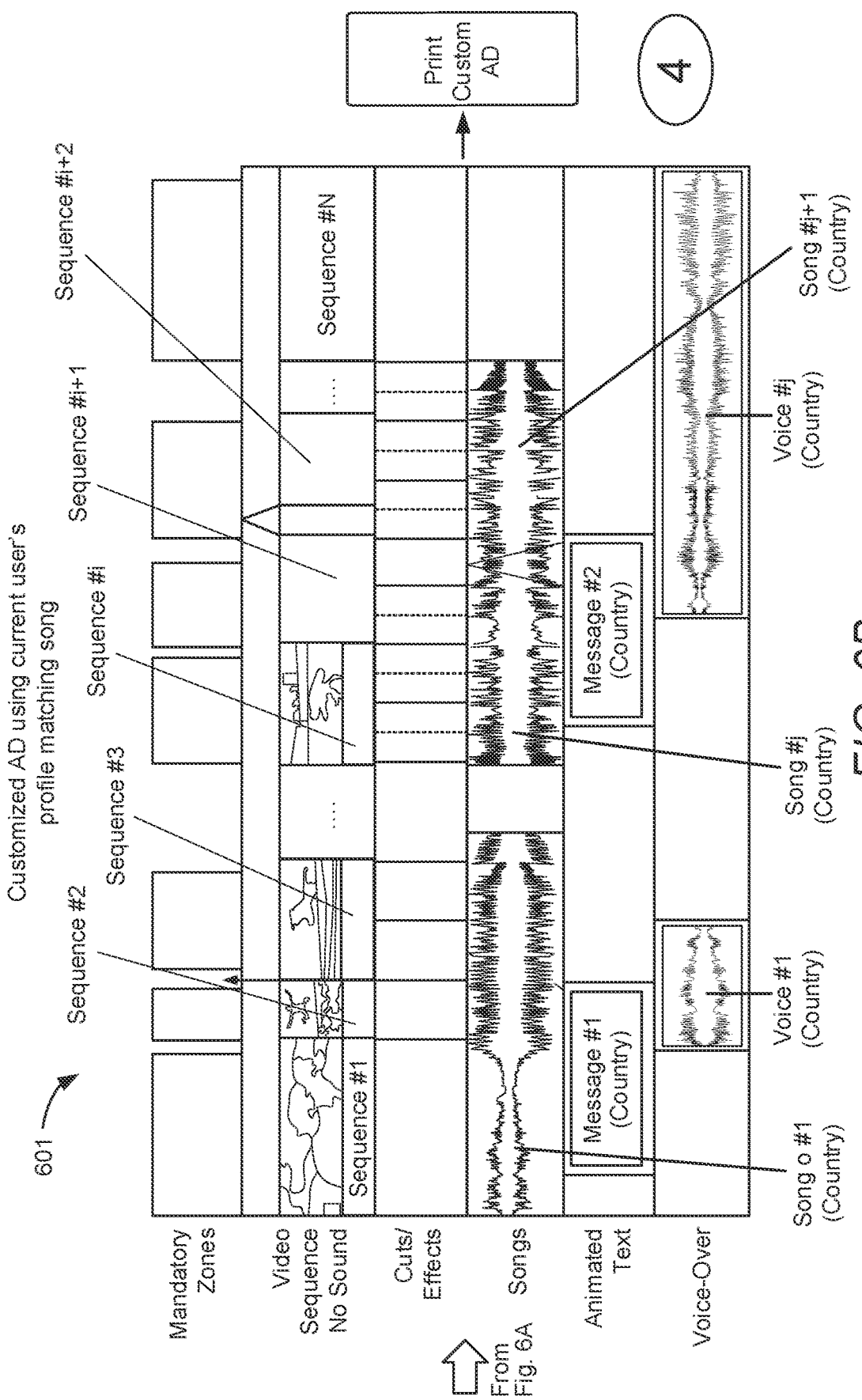
Figure 7A:
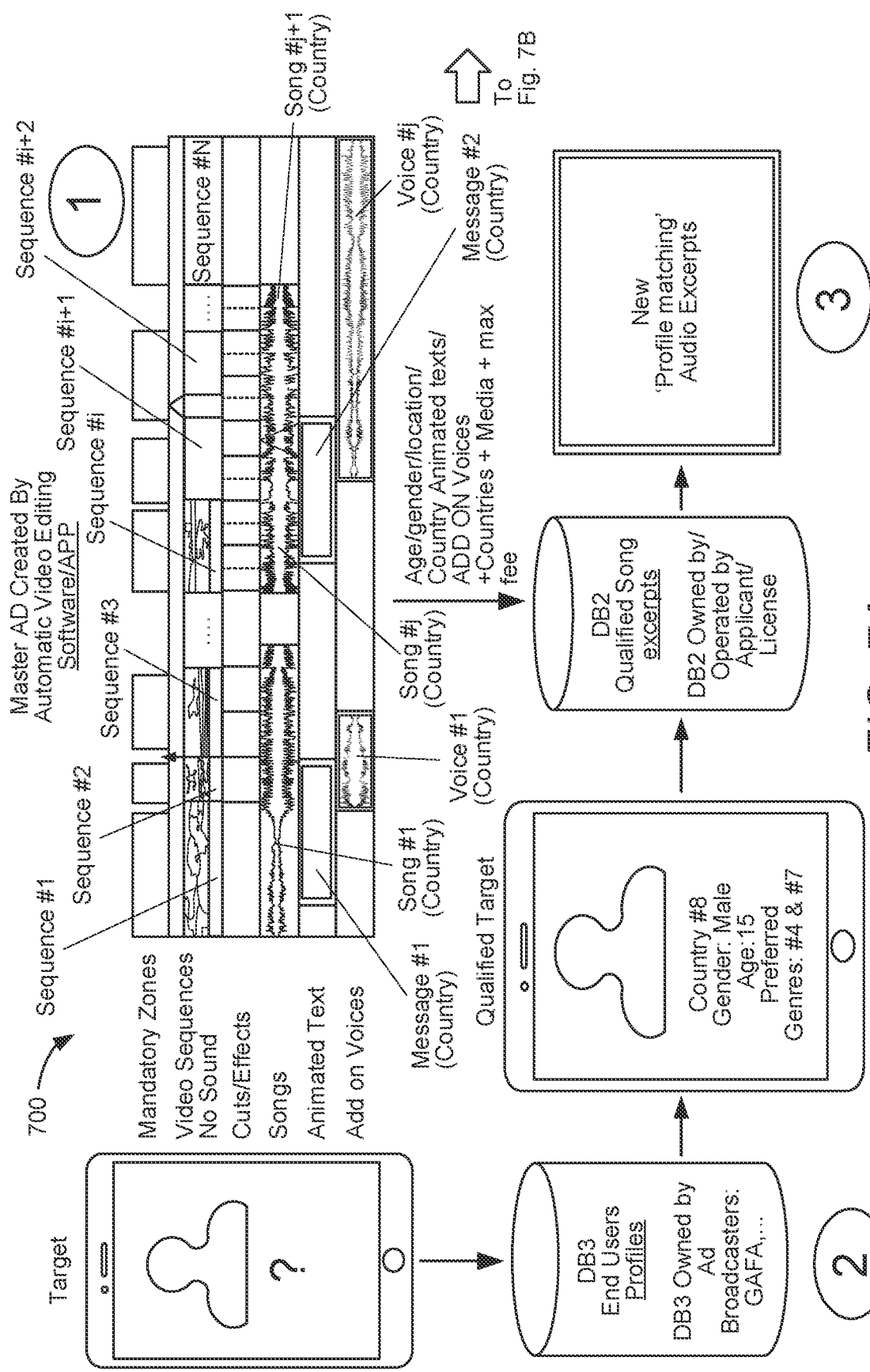
FIGS. 7A and 7B conceptually illustrate a customized ad generation process, according to some aspects of the disclosed technology.
Figure 7B:
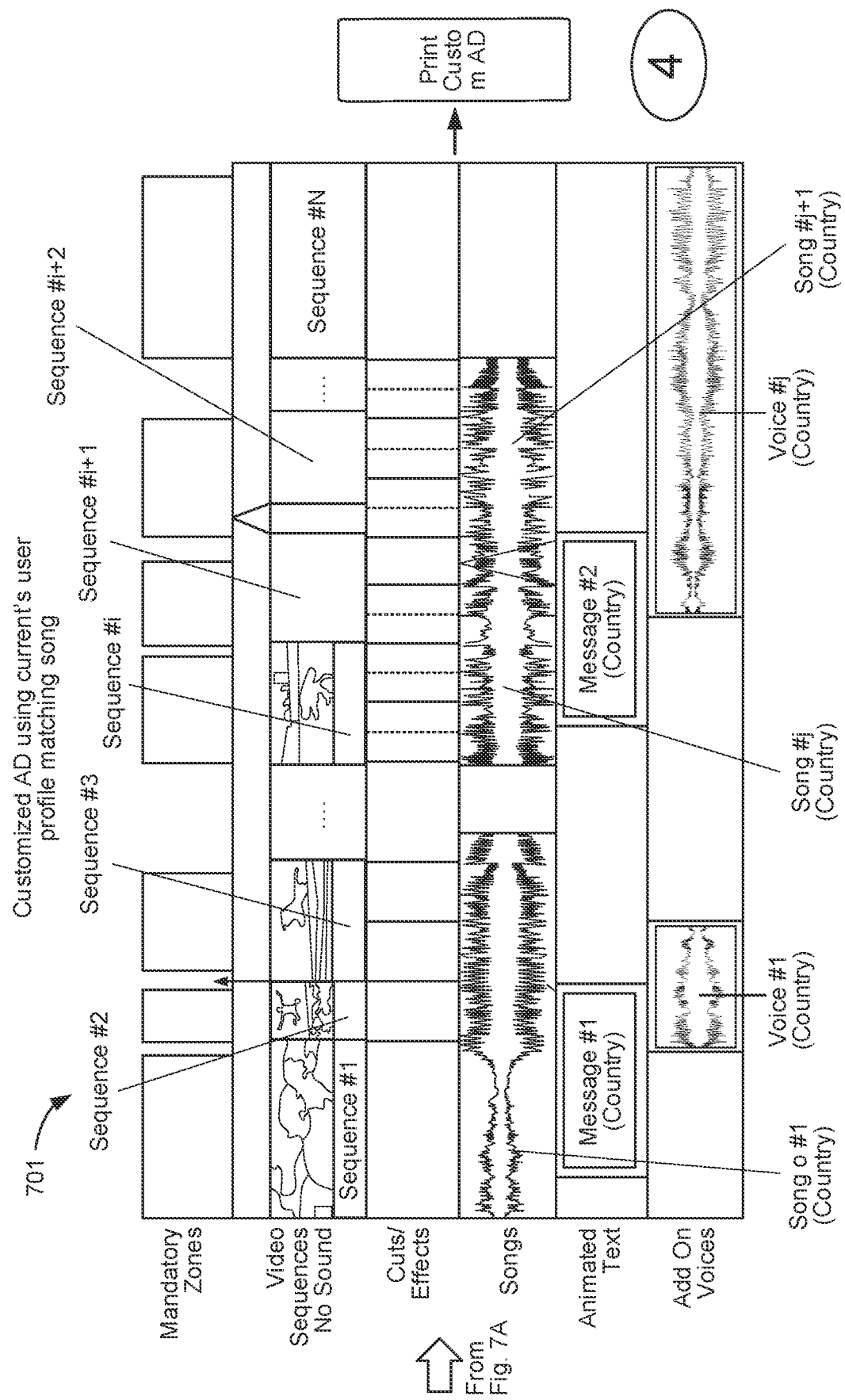
Figure 8:
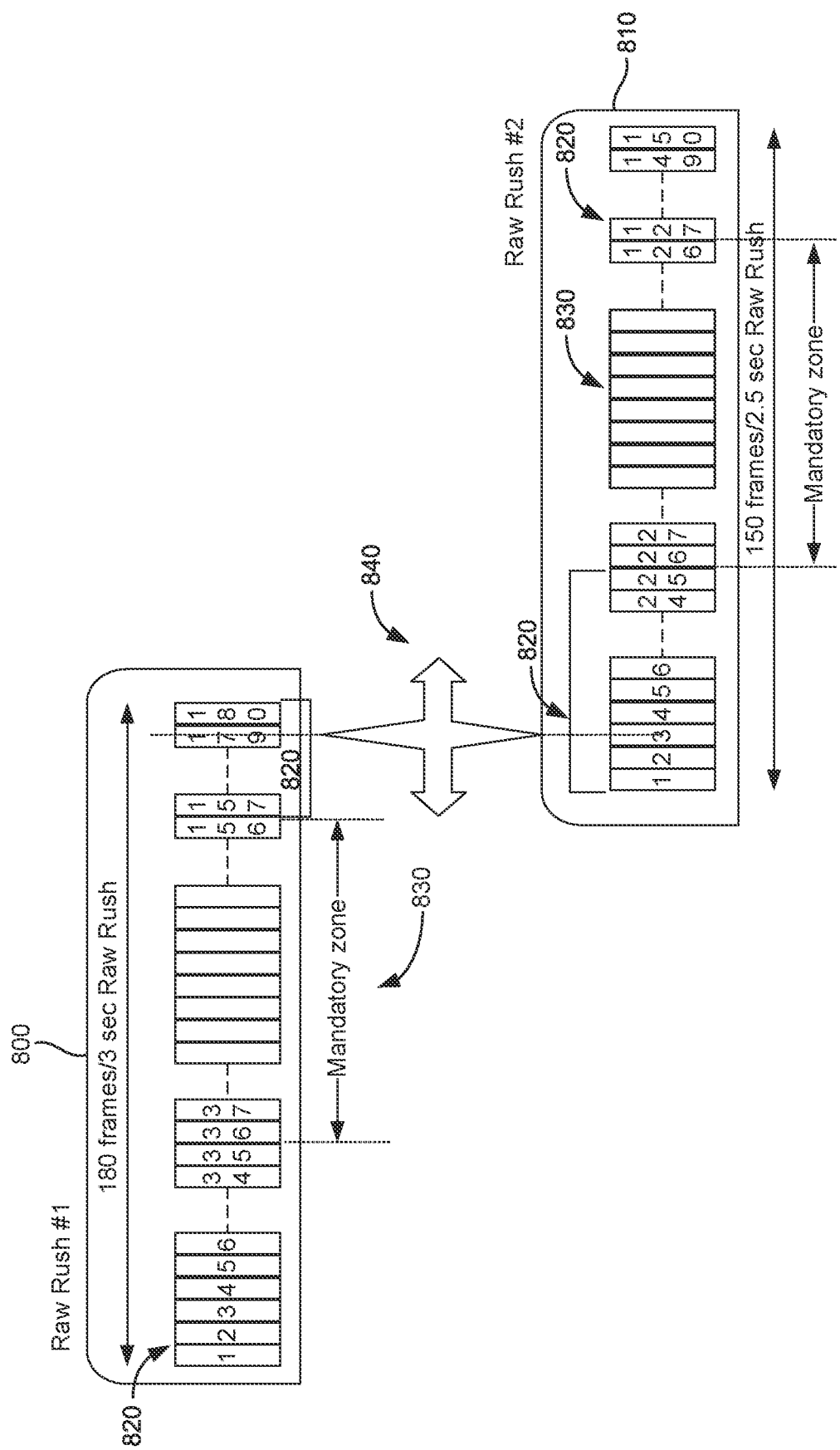
FIG. 8 conceptually illustrates various video frames that are edited within a raw rush, according to some aspects of the disclosed technology.

FIG. 6A and FIG. 6B and FIGS. 7A and 7B illustrate example processes on customizing a digital advertisement. FIGS. 6A and 6B illustrate an example of how a digital advertisement is customized/edited by an advertising agency (e.g. via a professional video editor). In contrast, FIGS. 7A and 7B shows that the digital advertisement can be edited automatically via software or an application (such as the Beat-Matching technology described in the '379 application). The use of the software or application would allow entities (e.g. small business) that do not have the resources to hire an advertising agency/professional video editor to still be able to generate customized digital advertisements.

In either example, in a first step, the digital advertisement will be initially edited whether it be by a professional video editor (FIGS. 6A and 6B) or via software application (FIGS. 7A and 7B). The digital advertisement (without any accompanying audio) will have one or more raw rushes (e.g. clips or segments) that would make up the entirety of the digital advertisement. Each of the raw rushes can have defined mandatory zones that correspond to the visual content that has to be shown to viewers and flexibility zones that define where transitions between different raw rushes can be introduced based on the accompanying song.

In addition, advertisers could provide their own preferences on the scope of their target audience related to the digital advertisement. For example, advertisers could identify what licensed songs could be used, where the digital advertisement should be shown, and what type of viewers should be targeted.

In a second step, information about viewers can be collected and used to identify potential targets for the digital advertisement. Not only is personal information about each viewer collected (e.g. gender, age, location) but also their preferences. The information could be collected, for example, via social media or other websites that the viewer visits. Viewers could potentially also provide their own information and preferences that could be collected and used for subsequent customization of digital advertisements.

In a third step, each viewer could have a list of licensed songs that are generated based on their information in their user profile. Their user profile may include, for example, preferences for a specific song genre or mood. Song excerpts that correspond to the viewer preference could be generated and stored in database 2. These songs can then be used to customize the digital advertisement for that user when the user views different advertisements.

In a fourth step, the appropriate song excerpt (based on the viewer preferences included in their profile) would be used with the digital advertisement. The information about the song excerpt will be used (either by the professional editor or the software) to customize the digital advertisement subject to the mandatory zones and flexibility zones present within the raw rushes of the digital advertisement. As described above, the customization involves introducing cuts (based on the accompanying song) that will provide for transitions between different raw rushes. The customization also includes different visual effects that can be introduced as well based on the accompanying song. Once the customizations have been incorporated into the advertisement, the customized digital advertisement can be provided to the viewer.

In a fifth optional step, a Customer/Agency can review all automatically edited versions of the Master Ad, for validation purpose.

Figure 9:
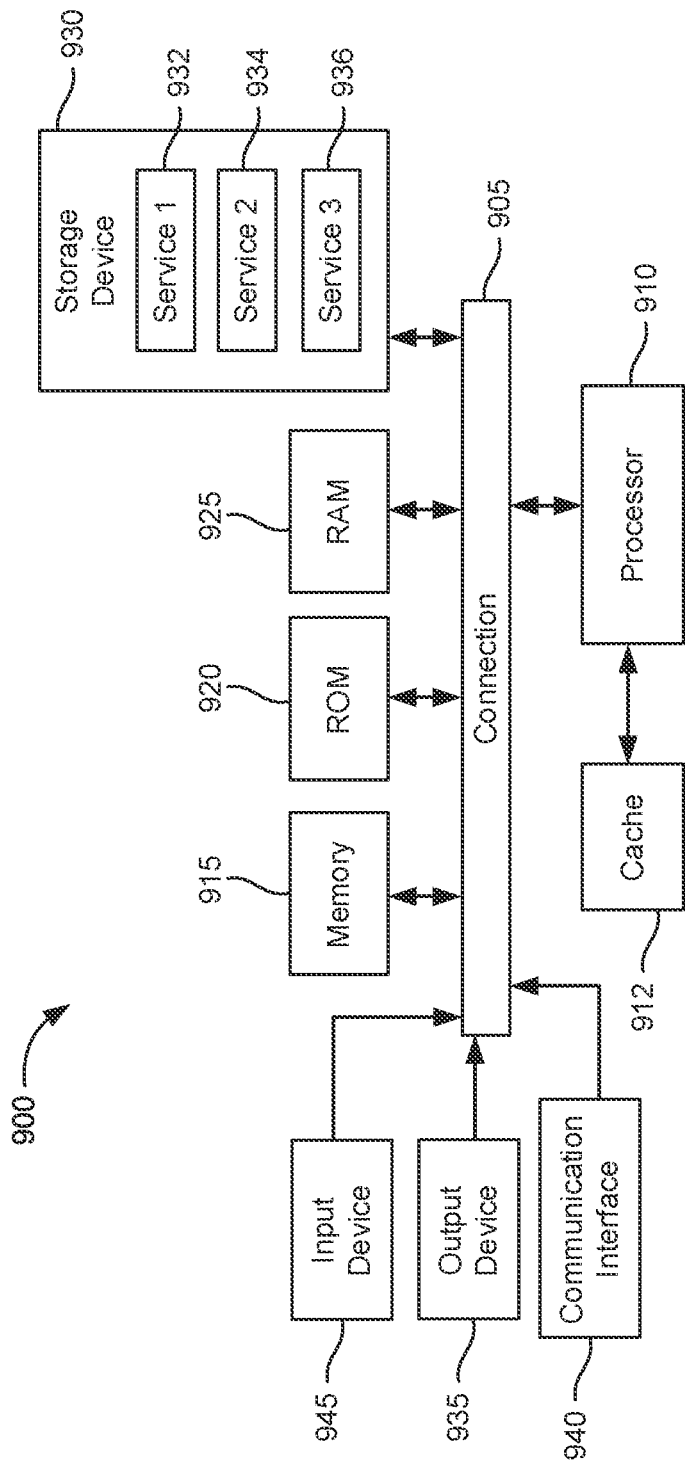
FIG. 9 illustrates an example of a processor-based system that can be used to implement some aspects of the disclosed technology.

FIG. 9 illustrates an example processor-based system with which some aspects of the subject technology can be implemented. For example, processor-based system 900 that can be any computing device that is configured to generate and/or display customized video content for a user and/or which is used to implement all, or portions of, a multimedia editing platform, as described herein. By way of example, system 900 can be a personal computing device, such as a smart phone, a notebook computer, or a tablet computing device, etc. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, in close proximity to, and/or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

By way of example, processor 910 may be configured to execute operations for automatically editing one or more video segments to produce a targeted advertisement. By way of example, processor 910 may be provisioned to execute any of the operations discussed above with respect to process 400, described in relation to FIG. 4. By way of example, processor 910 may be configured to executed operations for receiving, at a multimedia editing platform, a first video segment and a second video segment, receiving an audio file, at the multimedia editing platform, wherein the audio file comprises a musical selection corresponding with preferences of at least one user, automatically editing the first video segment, based on the musical selection to produce a first edited segment, automatically editing the second video segment, based on the musical selection, to produce a second edited segment, and automatically combining the first edited segment with the second edited segment and the musical selection.

In some aspects, processor 910 may be further configured for automatically editing the first video segment by identifying one or more flexibility zones in the first video segment, and wherein the first edited segment is based on the one or more flexibility zones. In some aspects, the one or more flexibility zones identify time-bounded segments in the first video segment for which editing is permitted.

In some aspects, processor 910 may be further configured for automatically editing the second video segment by identifying one or more mandatory zones in the second video segment, and wherein the second edited segment is based on the one or more mandatory zones, and wherein the one or more mandatory zones identify time-bounded segments in the second video segment for which editing is not permitted.

In some aspects, processor 910 can be further configured to perform operations for automatically editing the first video segment, by performing a beat matching process to identify one or more cuts in the first video segment based on the musical selection. In some aspects, processor 910 may be further configured to execute operations for generating a customized advertisement for the at least one user based on the first edited segment, the second edited segment, and the musical selection, and displaying the customized advertisement on a screen of a processor-based device associated with the at least one user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
   determining, at a multimedia editing platform, to customize a plurality of multimedia compilations for a plurality of target users, wherein audiovisual preferences associated with each target user is based on historical online user data comprising browsing or purchase history;
   receiving, at the multimedia editing platform, a first video segment and a second video segment, wherein the first video segment comprises a first mandatory zone and a first flexible zone and the second video segment comprises a second mandatory zone and a second flexible zone, wherein edits are not permitted in the first mandatory zone or the second mandatory zone;
   receiving a plurality of audio files, at the multimedia editing platform, wherein each audio file comprises a musical selection corresponding with the audiovisual preferences of each target user;
   corresponds to each target user based on a corresponding mandatory zone and a corresponding flexible zone, wherein edits are not permitted in the corresponding mandatory zone;
   automatically editing the first video segment, based on identified temporal locations one of the audio files to produce a plurality of first edited segments, wherein each first edited segment includes the first mandatory zone and a differently edited version of the first flexible zone, wherein the identified temporal locations are identified based on analyzing alternative waveforms filtered from a primary waveform of the one of the audio files wherein the analyzing of the alternative waveforms further comprises identifying song sections in the primary waveform representing the audio files that have a number of musical artifacts that exceeds a predetermined density threshold and generating a hit/no-hit output file that identifies the song sections in the primary waveform that contain the number of musical artifacts that exceeds the predetermined density threshold;

automatically editing the second video segment, based on the one of the audio files, to produce a plurality of second edited segments, wherein each second edited segment includes the second mandatory zone and a differently edited version of the second flexible zone; and automatically combining each first edited segment with each corresponding second edited segment and the corresponding audio file with a corresponding visual effect that transitions between each first edited segment and each corresponding second edited segment to form the customized multimedia compilation, wherein the visual effect is based on the audiovisual preference.

2. The computer-implemented method of claim 1, wherein automatically editing the first video segment further comprises:
identifying one or more flexibility zones in the first video segment based on each audio file.

3. The computer-implemented method of claim 2, wherein the one or more flexibility zones identify time-bounded segments in the first video segment for which editing is permitted.

4. The computer-implemented method of claim 1, wherein automatically editing the second video segment further comprises:
identifying one or more mandatory zones in the second video segment based on previously defined bounds.

5. The computer-implemented method of claim 4, wherein the one or more mandatory zones identify time-bounded segments in the second video segment for which editing is not permitted.

6. The computer-implemented method of claim 1, wherein automatically editing the first video segment, further comprises:
using a result of a beat matching process to identify one or more cuts in the first video segment based on the musical selection.

7. The computer-implemented method of claim 1, further comprising:
generating a customized advertisement for each target user ; and
causing to display the customized advertisement on a screen of a processor-based device associated with each target user.

8. A system comprising:
one or more processors; and
a computer-readable medium coupled to the one or more processors, the computer-readable medium comprising instructions stored therein, which when executed by the one or more processors, cause the one or more processors to perform operations comprising:
determining, at a multimedia editing platform, to customize a plurality of multimedia compilations for a plurality of target users, wherein audiovisual preferences associated with each target user is based on historical online user data comprising browsing or purchase history;
receiving, at the multimedia editing platform, a first video segment and a second video segment, wherein the first video segment comprises a first mandatory zone and a first flexible zone and the second video segment comprises a second mandatory zone and a second flexible zone, wherein edits are not permitted in the first mandatory zone or the second mandatory zone;

receiving a plurality of audio files, at the multimedia editing platform, wherein each audio file comprises a musical selection corresponding with the audiovisual preferences of each target user;

automatically editing the first video segment, based on identified temporal locations one of the audio files to produce a plurality of first edited segments, wherein each first edited segment includes the first mandatory zone and a differently edited version of the first flexible zone, wherein the identified temporal locations are identified based on analyzing alternative waveforms filtered from a primary waveform of the one of the audio files wherein the analyzing of the alternative waveforms further comprises identifying song sections in the primary waveform representing the audio files that have a number of musical artifacts that exceeds a predetermined density threshold and generating a hit/no-hit output file that identifies the song sections in the primary waveform that contain the number of musical artifacts that exceeds the predetermined density threshold;

automatically editing the second video segment, based on the one of the audio files, to produce a plurality of second edited segments, wherein each second edited segment includes the second mandatory zone and a differently edited version of the second flexible zone; and automatically combining each first edited segment with each corresponding second edited segment and the corresponding audio file with a corresponding visual effect that transitions between each first edited segment and each corresponding second edited segment to form the customized multimedia compilation, wherein the visual effect is based on the audiovisual preference.

9. The system of claim 8, wherein automatically editing the first video segment further comprises:
identifying one or more flexibility zones in the first video segment based on each audio file.

10. The system of claim 9, wherein the one or more flexibility zones identify time-bounded segments in the first video segment for which editing is permitted.

11. The system of claim 8, wherein automatically editing the second video segment further comprises:
identifying one or more mandatory zones in the second video segment based on previously defined bounds.

12. The system of claim 11, wherein the one or more mandatory zones identify time-bounded segments in the second video segment for which editing is not permitted.

13. The system of claim 8, wherein automatically editing the first video segment, further comprises:
using a result of a beat matching process to identify one or more cuts in the first video segment based on the musical selection.

14. The system of claim 8, wherein the processors are further configured to execute operations comprising:
generating a customized advertisement for each target user ; and
causing to display the customized advertisement on a screen of a processor-based device associated with each target user.

15. A non-transitory computer-readable storage medium having instructions embodied thereon, wherein the instructions are executable by a processor to perform operations comprising:

determining, at a multimedia editing platform, to customize a plurality of multimedia compilations for a plurality of target users, wherein audiovisual preferences associated with each target user is based on historical online user data comprising browsing or purchase history;

receiving, at the multimedia editing platform, a first video segment and a second video segment, wherein the first video segment comprises a first mandatory zone and a first flexible zone and the second video segment comprises a second mandatory zone and a second flexible zone, wherein edits are not permitted in the first mandatory zone or the second mandatory zone;

receiving a plurality of audio files, at the multimedia editing platform, wherein each audio file comprises a musical selection corresponding with the audiovisual preferences of each target user;

automatically editing the first video segment, based on identified temporal locations one of the audio files to produce a plurality of first edited segments, wherein each first edited segment includes the first mandatory zone and a differently edited version of the first flexible zone, wherein the identified temporal locations are identified based on analyzing alternative waveforms filtered from a primary waveform of the one of the audio files, wherein the analyzing of the alternative waveforms further comprises identifying song sections in the primary waveform representing the audio files that have a number of musical artifacts that exceeds a predetermined density threshold and generating a hit/no-hit output file that identifies the song sections in the primary waveform that contain the number of musical artifacts that exceeds the predetermined density threshold;

automatically editing the second video segment, based on the one of the audio files, to produce a plurality of second edited segments, wherein each second edited segment includes the second mandatory zone and a differently edited version of the second flexible zone; and automatically combining each first edited segment with each corresponding second edited segment and the corresponding audio file with a corresponding visual effect that transitions between each first edited segment and each corresponding second edited segment to form the customized multimedia compilation, wherein the visual effect is based on the audiovisual preference.

16. The non-transitory computer-readable storage medium of claim 15, wherein automatically editing the first video segment further comprises:

identifying one or more flexibility zones in the first video segment based on each audio file.

17. The non-transitory computer-readable storage medium of claim 16, wherein the one or more flexibility zones identify time-bounded segments in the first video segment for which editing is permitted.

18. The non-transitory computer-readable storage medium of claim 15, wherein automatically editing the second video segment further comprises:

identifying one or more mandatory zones in the second video segment based on previously defined bounds.

19. The non-transitory computer-readable storage medium of claim 18, wherein the one or more mandatory zones identify time-bounded segments in the second video segment for which editing is not permitted.

20. The non-transitory computer-readable storage medium of claim 15, wherein automatically editing the first video segment, further comprises:

using a result of a beat matching process to identify one or more cuts in the first video segment based on the musical selection.

* * * * *